(12) United States Patent
Yang et al.

(10) Patent No.: US 10,955,684 B2
(45) Date of Patent: Mar. 23, 2021

(54) GRATING DRIVING CIRCUIT, DRIVING METHOD AND NAKED-EYE 3D DISPLAY

(71) Applicant: BOE TECHNOLOGY GROUP CO., LTD., Beijing (CN)

(72) Inventors: Ming Yang, Beijing (CN); Xiaochuan Chen, Beijing (CN); Wenqing Zhao, Beijing (CN); Chenyu Chen, Beijing (CN); Jinye Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 68 days.

(21) Appl. No.: 16/339,063

(22) PCT Filed: Sep. 7, 2018

(86) PCT No.: PCT/CN2018/104548
§ 371 (c)(1),
(2) Date: Apr. 3, 2019

(87) PCT Pub. No.: WO2019/148842
PCT Pub. Date: Aug. 8, 2019

(65) Prior Publication Data
US 2020/0183182 A1 Jun. 11, 2020

(30) Foreign Application Priority Data
Jan. 30, 2018 (CN) .......................... 201810089682.6

(51) Int. Cl.
*G02B 30/40* (2020.01)
*G02F 1/29* (2006.01)
*G06F 3/01* (2006.01)

(52) U.S. Cl.
CPC ............. *G02B 30/40* (2020.01); *G02F 1/292* (2013.01); *G06F 3/013* (2013.01)

(58) Field of Classification Search
CPC .... H04N 13/10; H04N 13/111; H04N 13/117; H04N 21/8146; H04N 21/816; G06F 3/013; G02B 30/40; G02F 1/292
See application file for complete search history.

(56) References Cited

U.S. PATENT DOCUMENTS

| | | | |
|---|---|---|---|
| 2014/0063381 A1* | 3/2014 | Zhang | H04N 13/398 349/15 |
| 2016/0182899 A1* | 6/2016 | Liu | H04N 13/31 348/54 |

(Continued)

FOREIGN PATENT DOCUMENTS

| | | |
|---|---|---|
| CN | 102572483 A | 7/2012 |
| CN | 102650742 A | 8/2012 |

(Continued)

OTHER PUBLICATIONS

First Office Action for Chinese Patent Application No. 201810089682.6 dated Dec. 2, 2019.

(Continued)

*Primary Examiner* — Mulugeta Mengesha
(74) *Attorney, Agent, or Firm* — Calfee, Halter & Griswold LLP

(57) ABSTRACT

A grating driving circuit, including: a grating including a plurality of grating elements, each having an on/off state controlled by a grating driving signal; a viewpoint tracker for determining a viewing distance of a viewer; a plurality of grating control electrodes with each configured to control the on/off state of a corresponding grating element in the grating according to a grating driving signal; a grating driving signal generator for generating a plurality of sets of grating driving signals with each set corresponding to a viewing distance and including a plurality of grating driving signals; and a grating driving controller for determining a set of grating driving signals corresponding to the viewing (Continued)

distance, and forming grating periods corresponding to the viewing distance, each grating period including a plurality of grating control electrodes that correspond to the plurality of grating driving signals in a one-to-one relationship.

20 Claims, 10 Drawing Sheets

(56) References Cited

U.S. PATENT DOCUMENTS

2018/0107089 A1    4/2018   Zhao et al.
2020/0142214 A1*   5/2020   Wang .................. G02F 1/13306

FOREIGN PATENT DOCUMENTS

| CN | 102710956 A | 10/2012 |
|----|-------------|---------|
| CN | 104597681 A | 5/2015 |
| CN | 105445948 A | 3/2016 |
| CN | 105954956 A | 9/2016 |
| CN | 106526878 A | 3/2017 |
| CN | 106918956 A | 7/2017 |
| KR | 1020120134023 A | 12/2012 |

OTHER PUBLICATIONS

Search Report and Written Opinion for International Application No. PCT/Cn2018/104548 dated Nov. 28, 2018.
Second Office Action for Chinese Patent Application No. 201810089682.6 dated May 18, 2020.

\* cited by examiner

Determine an overall grating width W through the following formula:
$$W = 2NP\frac{LS}{LS+PS_0},$$
wherein 2N is a resolution of a 2D display screen in a horizontal direction, P is a pixel or sub-pixel width of the 2D display screen, L is an interpupillary distance of human eyes, $S_0$ is a predetermined optimal viewing distance, and a placement height of the grating is set according to the viewing distance S

S1110

Determine a grating period through the following formula:
$$C = 2P\frac{LS}{LS+PS_0},$$
wherein P is a pixel or sub-pixel width of the 2D display screen, and L is an interpupillary distance of human eyes

S1120

Determine the number M of grating control electrodes in each grating period and the number M of grating driving signals in the set of grating driving signals through the following formula:
$$M = \frac{C}{W_e},$$ wherein $W_e$ is an electrode width

GRATING DRIVING CIRCUIT, DRIVING METHOD AND NAKED-EYE 3D DISPLAY

RELATED APPLICATIONS

The present application is the U.S. national phase entry of PCT/CN2018/104548, with an international filling date of Sep. 7, 2018, which claims the benefit of Chinese Patent Application No. 201810089682.6, filed on Jan. 30, 2018, the entire disclosure of which is incorporated herein by reference.

FIELD

The present invention relates to the field of display technology, and more particularly to a grating driving circuit, a driving method and a naked-eye 3D display.

BACKGROUND

With the development of scientific technologies and the improvement of life quality, people are no longer satisfied with the traditional two-dimensional image display, and stereoscopic display technology has become an astonishing technical field. In a stereoscopic display technology, users need to view stereoscopic images with the aid of an external auxiliary tool, such as polarizing glasses, complementary color glasses, LCD glasses, which is subject to great limitations and is not convenient for users.

In addition, there is also a stereoscopic display technology which is a naked-eye 3D (three-dimensional) display technology. Naked-eye 3D display technology is developed on the basis of binocular disparity and mainly comprises grating stereoscopic display technology. Because a grating has a light dispersing effect, it has an effect of separating images when being applied to a display. In recent years, naked-eye 3D display technology has developed rapidly. Grating naked-eye 3D technology is now an important direction of naked-eye 3D technology due to its simple manufacturing process and better 3D effect. As for a liquid crystal grating, there is an optimal viewing distance, and there is a liquid crystal grating period corresponding to the optimal viewing distance. At the optimal viewing distance, a left eye and a right eye may see a corresponding left eye view and a corresponding right eye view respectively with less crosstalk and an optimum 3D effect.

SUMMARY

According to an exemplary embodiment, there is provided a grating driving circuit. The grating driving circuit comprises a grating comprising a plurality of grating elements having respective on/off states controlled by grating driving signals; a viewpoint tracker configured to determine a viewing distance S of a viewer; a plurality of grating control electrodes configured to control the on/off states of corresponding grating elements in the grating according to the grating driving signals; a grating driving signal generator configured to generate a plurality of sets of grating driving signal, wherein a set of grating driving signal corresponds to a viewing distance and comprising a plurality of grating driving signals; and a grating driving controller configured to determine a set of grating driving signals that corresponds to the viewing distance, and configured to form grating periods corresponding to the viewing distance, wherein an individual grating period includes a plurality of grating control electrodes that correspond to the plurality of grating driving signals in a one-to-one relationship.

In an exemplary embodiment, the grating driving controller may further comprise a plurality of switch units configured to connect the set of grating driving signals that corresponds to the viewing distance and disconnect other sets of grating driving signals.

In an exemplary embodiment, the grating may comprise two substrates that are oppositely disposed and a liquid crystal layer or electrochromic material layer located between the two substrates.

In an exemplary embodiment, the grating driving controller may also be configured to determine an overall grating width W through the following formula:

$$W = 2NP\frac{LS}{LS + PS_0},$$

wherein 2N is a resolution of a 2D display screen in a horizontal direction, P is a pixel or sub-pixel width of the 2D display screen, L is an interpupillary distance of human eyes, $S_0$ is a predetermined optimal viewing distance, and a placement height of the grating is set according to the viewing distance $S_0$.

In an exemplary embodiment, the grating driving controller may also be configured to determine the grating period C through the following formula:

$$C = \frac{W}{N} = 2P\frac{LS}{LS + PS_0}.$$

In an exemplary embodiment, the grating driving controller may also be configured to determine the number M of grating control electrodes in each grating period and the number M of the grating driving signals in the set of grating driving signals through the following formula:

$$M = \frac{C}{w_e},$$

wherein $W_e$ is an electrode width.

In an exemplary embodiment, the viewpoint tracker may also be configured to determine a position of the viewer in a left-right direction, and the grating driving controller may also be configured to determine a position of the grating according to the position of the viewer in the left-right direction.

In an exemplary embodiment, each grating period comprises a grating opening portion and a grating blocking portion, which are equal in size.

In an exemplary embodiment, the grating driving controller may also be configured to determine the level of each grating driving signal in the set of grating driving signals.

According an exemplary embodiment, there is provided a grating driving method, comprising: determining a viewing distance S of a viewer; determining a set of grating driving signals that corresponds to the viewing distance, the set of grating driving signals comprising a plurality of grating driving signals; forming grating periods corresponding to the viewing distance, wherein an individual grating period comprises a plurality of grating control electrodes that correspond to the plurality of grating driving signals in a one-to-one relationship; and driving the plurality of grating control electrodes in individual grating periods by the plurality of grating driving signals to control on/off states of grating elements in the grating that correspond to the grating control electrodes according to respective grating driving signals, so as to form a grating used for a naked-eye 3D display.

In an exemplary embodiment, the step of determining a set of grating driving signals that corresponds to the viewing distance may further comprise:

determining an overall grating width W through the following formula:

$$W = 2NP\frac{LS}{LS+PS_0},$$

wherein 2N is a resolution of a 2D display screen in a horizontal direction, P is a pixel or sub-pixel width of the 2D display screen, L is an interpupillary distance of human eyes, $S_0$ is a predetermined optimal viewing distance, and a placement height of the grating is set according to the viewing distance $S_0$.

In an exemplary embodiment, the step of determining a set of grating driving signals that corresponds to the viewing distance may further comprise:

determining the grating period through the following formula:

$$C = \frac{W}{N} = 2P\frac{LS}{LS+PS_0}.$$

In an exemplary embodiment, the step of determining a set of grating driving signals that corresponds to the viewing distance may further comprise:

determining the number M of grating control electrodes in each grating period and the number M of the grating driving signals in the set of grating driving signals through the following formula:

$$M = \frac{C}{W_e},$$

wherein $W_e$ is an electrode width.

In an exemplary embodiment, the step of forming grating periods corresponding to the viewing distance may further comprise: determining a position of the viewer in a left-right direction, and determining a position of the grating according to the position of the viewer in the left-right direction.

In an exemplary embodiment, the step of forming grating periods corresponding to the viewing distance may further comprise: dividing the grating period into a grating opening portion and a grating blocking portion, which are equal in size.

In an exemplary embodiment, the grating driving method may further comprise determining the level of each grating driving signal in the set of grating driving signals before driving the plurality of grating control electrodes in each grating period by the plurality of grating driving signals.

According to an exemplary embodiment, there is provided a naked-eye 3D display. The naked-eye 3D display may comprise a 2D display screen and any grating driving circuit as stated above.

This summary introduces, in a simplified form, some exemplary embodiments, which will be further described in the Detailed Description. This summary does not intend to provide the essential or substantive features of the claimed subject matter or limit the scope of the claimed subject matter. Moreover, as stated herein, other various features and advantages may also be incorporated into these technologies as required.

BRIEF DESCRIPTION OF DRAWINGS

To explain the technical solutions of some exemplary embodiments more clearly, the present disclosure provides the following drawings for use when describing the exemplary embodiments. It should be realized that the following drawings are only related to some exemplary embodiments. Those of ordinary skill in the art may also obtain other embodiments from these drawings without making any inventive effort, and said other embodiments are also within the scope of the present disclosure.

FIG. 11 is a schematic flow chart showing a method for determining a set of grating driving signals corresponding to a viewing distance according to an exemplary embodiment.

DETAILED DESCRIPTION

To understand the objects, technical solutions and advantages of some exemplary embodiments more clearly, those exemplary embodiments will be described in detail with reference to the drawings and specific implementations.

The inventor realizes that the current naked-eye 3D display technology may achieve a good 3D effect at an optimal viewing distance, but when a viewer deviates from the optimal viewing distance, that is, when human eyes move in the front-rear direction relative to a screen, the left eye and the right eye may not obtain a corresponding view independently at a place deviating from the optimal viewing distance, crosstalk significantly increases and the 3D effect gets worse because it is impossible to adjust the grating period in a current grating driving mode. Thus, in the art, it is desired to provide a grating driving circuit using a novel driving method, a driving method and a naked-eye 3D display to ensure that the viewing distance of the naked-eye 3D grating is adjustable. That is to say, even though human eyes move in the front-rear direction relative to a screen, the left eye and the right eye may obtain a corresponding left-eye view and a corresponding right-eye view respectively with less crosstalk and an optimum 3D effect.

Figure 1:
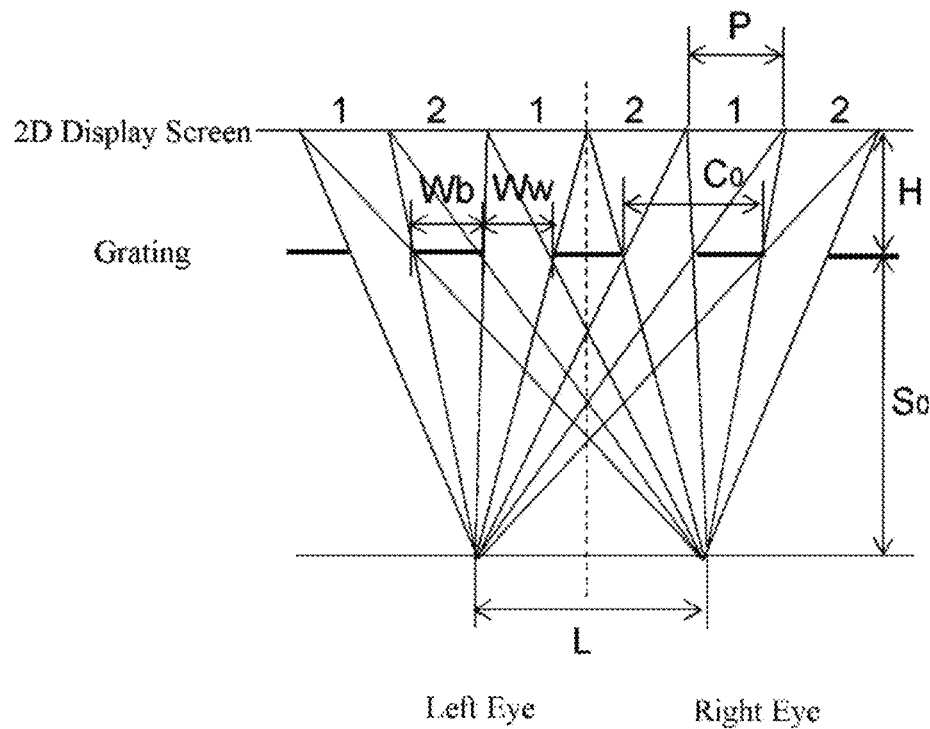
FIG. 1 is a view showing the 3D display principle of a naked-eye 3D display.

FIG. 1 schematically shows the 3D display principle of the naked-eye 3D display. The naked-eye 3D display comprises a 2D display screen and a grating. The grating herein may be a liquid crystal grating or a grating made of an electrochromic material. As shown in FIG. 1, the 2D display screen can show Views 1 and Views 2 which are spaced alternately, and there are subtle nuances between adjacent View 1 and View 2. The grating comprises a grating opening portion $W_w$ and a grating blocking portion $W_b$. Through the grating opening portion $W_w$, the left eye can see View 1, but not View 2, whereas the right eye can see View 2, but not View 1. Thus, the view seen by the left eye and the view seen by the right eye are blended in brain so as to form a stereoscopic image therein. As shown, the sum of the grating opening portion $W_w$ and the grating blocking portion $W_b$ constitutes a grating period $C_0$. H is the grating placement height, i.e., the distance between the grating and the 2D display screen. In comparison with the 2D display screen, the grating is placed closer to human eyes. Suppose $S_0$ is the optimal viewing distance, L is an interpupillary distance of human eyes, and P is a pixel or sub-pixel width of the 2D display screen. As shown in FIG. 1, at the optimal viewing distance $S_0$, the left eye and right eye can see View 1 and View 2 respectively, but one eye cannot see the view seen by the other eye. Thus, a best 3D display effect can be achieved.

According to FIG. 1, the following formula may be obtained by inference from a geometric formula:

$$\frac{P}{L} = \frac{H}{S_0}. \qquad (1)$$

Figure 2:
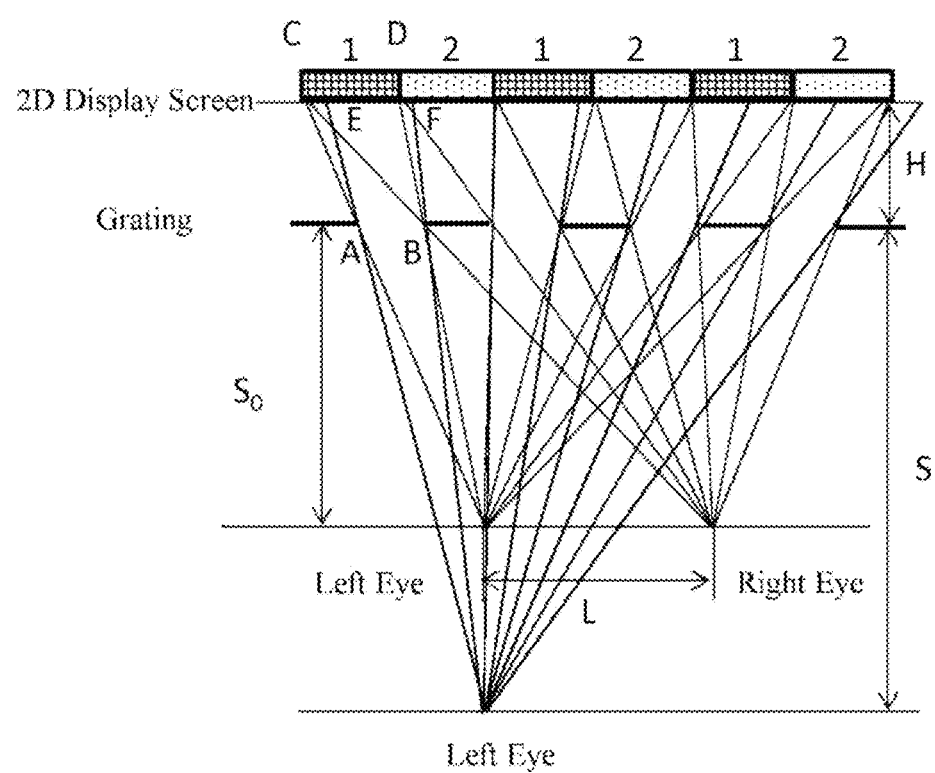
FIG. 2 is an optical path map formed when a viewing distance deviates from an optimal viewing distance $S_0$ according to an exemplary embodiment.

FIG. 2 schematically shows an optical path map formed when a viewing distance deviates from an optimal viewing distance $S_0$ according to an exemplary embodiment. Here, explanation is made by taking an example in which a viewer moves away from a screen at the optimal viewing distance $S_0$. As shown, when human eyes are at the optimal viewing distance $S_0$ from the screen, the left eye can see an area CD of the 2D display screen through the grating opening portion AB, and the area CD is the left-eye View 1. When the distance between human eyes and the screen is changed to S, the left eye can see an area EF of the 2D display screen through the grating opening portion AB. It may be found that the area ED belongs to View 1, and the area DF belongs to View 2. At this point, the left eye can see a part of View 1 and View 2 simultaneously, which gives rise to crosstalk and thereby leads to a worse 3D display effect, or a 3D display effect that cannot be achieved at all. It may be found that when the grating placement height H is fixed, no crosstalk occurs only if the viewing distance is the optimal viewing distance $S_0$, and crosstalk will occur at other viewing distances. However, those of ordinary skill in the art will understand that there is still a front-rear movement range for human eyes around this optimal viewing distance $S_0$. Within this front-rear movement range, human eyes can still see the 3D image, and the 3D display effect may still meet the requirement to some extent. The front-rear movement range is labelled as $^\Delta S$. Human eyes can still see a 3D image within the range from $S_0-^\Delta S$ to $S_0+^\Delta S$. Theoretically speaking, crosstalk will occur when eyes deviate from the optimal viewing distance $S_0$, but human eyes may not observe the crosstalk within that range and the 3D effect can still be deemed as satisfactory. Therefore, the range from $S_0-^\Delta S$ to $S_0+^\Delta S$ may be regarded as the optimal viewing distance.

Figure 3:
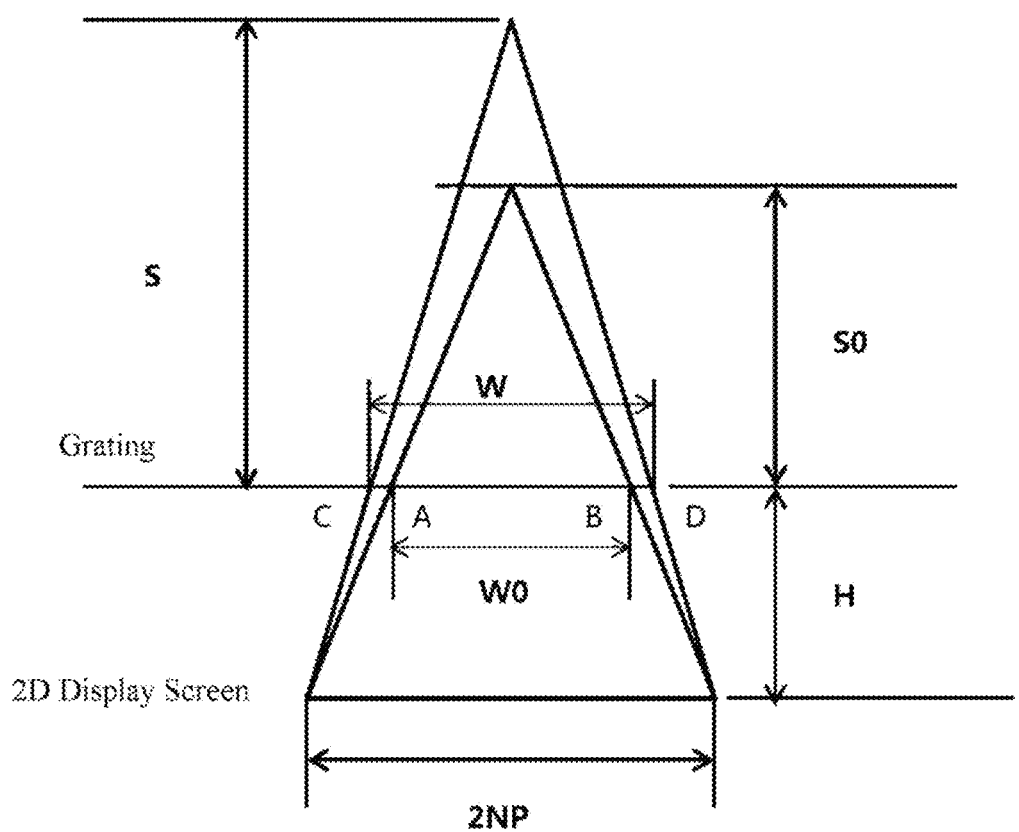
FIG. 3 is a schematic view of a naked-eye 3D grating with an adjustable viewing distance according to an exemplary embodiment.

FIG. 3 shows a schematic view of a naked-eye 3D grating with an adjustable viewing distance according to an exemplary embodiment. Suppose the horizontal resolution of the 2D display screen is 2N, and the 3D display uses two views, namely View 1 and View 2 as stated above, then it may be known that the total number of grating periods is N. At the optimal viewing distance $S_0$, the total grating width is $W_0$. At the viewing distance S, the total grating width is W. The grating placement height H may be set according to the optimal viewing distance $S_0$. Those of ordinary skill in the art know that a target viewing distance may be predetermined when designing and manufacturing displays. For example, a target viewing distance of a desktop display can range from 65 cm to 90 cm, and a target viewing distance of a TV may be determined according to the size of the TV and the size of the room where the TV is going to be placed. In an exemplary embodiment, the optimal viewing distance $S_0$ may be set according to the target viewing distance, and then the grating placement height H may be set according to the optimal viewing distance $S_0$.

According to the optical path map in FIG. 3, it may be derived:

$$\frac{W_0}{2NP} = \frac{S_0}{S_0 + H}. \qquad (2)$$

By transforming the formula (2), one may obtain the total grating width $W_0$ corresponding to the viewing distance $S_0$ as follows:

$$W_0 = 2NP\frac{S_0}{S_0 + H}. \qquad (3)$$

By transforming the formula (1), one may obtain $$\frac{S_0}{S_0 + H} = \frac{L}{L + P},$$

and after substituting it into the formula (3), one may obtain:

$$W_0 = 2NP\frac{L}{L + P}. \qquad (4)$$

Therefore, the grating period corresponding to the viewing distance $S_0$ may be obtained:

$$C_0 = \frac{W_0}{N} = \frac{2PL}{L + P}. \qquad (5)$$

As for the viewing distance S which is different from the viewing distance $S_0$, one may obtain $$\frac{W}{2NP} = \frac{S}{S+H}$$

according to the optical path map of FIG. 3, which formula may be transformed as follows:

$$W = 2NP\frac{S}{S+H}. \quad (6)$$

The formula (1) may be transformed into $$H = \frac{PS_0}{L},$$

which may be substituted into the formula (6) to obtain the formula as follows:

$$W = 2NP\frac{LS}{LS + PS_0}. \quad (7)$$

The grating period corresponding to the viewing distance S is:

$$C = \frac{W}{N} = 2P\frac{LS}{LS + PS_0}. \quad (8)$$

It may be found that $C \neq C_0$, and the difference between grating periods is as follows:

$$\Delta C = C - C_0 = 2P^2 \frac{L(S - S_0)}{(LS + PS_0) * (L + P)}. \quad (9)$$

Since each grating period consists of a plurality of grating driving electrodes, each grating period calculated according to each viewing distance may comprise an integral number of electrodes, so as to ensure an optimal 3D effect in the grating period. Since the grating period $C_0$ corresponding to the optimal viewing distance $S_0$ is determined in advance according to actual technical conditions and technical requirements, and may realize an optimal 3D effect, the grating period $C_0$ will comprise an integral number of electrodes. Thus, in order to also achieve an optimal 3D effect at the distance S, it is required to ensure $\Delta C$ is a width of an integral number of electrodes, namely a width of at least one electrode. With respect to a viewing distance that allows achieving an optimal 3D effect by means of embodiments of the present disclosure and is closest to the optimal viewing distance $S_0$, it is required to ensure that $\Delta C$ is a width of one electrode so as to guarantee the uniformity of grating driving electrodes.

The above is related to the calculation of the grating period based on the viewing distance. In turn, it is also possible to sequentially calculate the corresponding optimal viewing distance for the grating periods of an integral number of electrodes, thereby obtaining a series of optimal viewing distances according to different grating period configurations.

It should be noted that in the context of the present disclosure, "grating driving electrode" and "electrode" may be used interchangeably.

On the basis of the principles set forth above, the present disclosure provides a grating driving circuit and method, which allow that the viewing distance of the naked-eye 3D grating is adjustable. That is to say, even though human eyes move in the front-rear direction relative to a screen, they may still see a corresponding left-eye view and a corresponding right-eye view respectively with less crosstalk and an optimal 3D effect. According to some exemplary embodiments, the grating driving circuit and method as described above may determine, according to the distance between the viewer and the grating, a set of driving signals corresponding to the distance and form a grating period corresponding to the distance. In this way, naked-eye 3D display with adjustable viewing distances may be realized.

Figure 4:
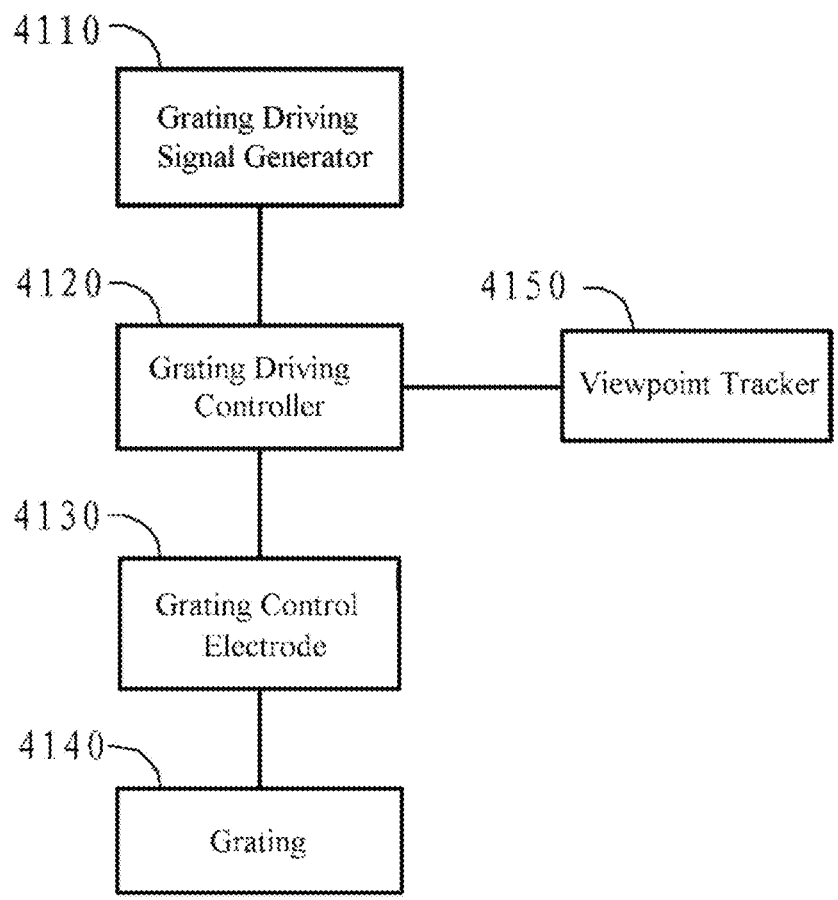
FIG. 4 is a structural block diagram of a naked-eye 3D display with an adjustable viewing distance according to an exemplary embodiment.

FIG. 4 schematically shows a structural block diagram of a naked-eye 3D display 4000 according to an exemplary embodiment. As shown in FIG. 4, the naked-eye 3D display 4000 may comprise a grating driving circuit 4100 and a 2D display screen 4200. The grating driving circuit 4100 may comprise a grating driving signal generator 4110, a grating driving controller 4120, a plurality of grating control electrodes 4130, a grating 4140 and a viewpoint tracker 4150. The grating 4140 may comprise a plurality of grating elements, each having an on/off state controlled by a grating driving signal. The viewpoint tracker 4150 may be configured to determine a viewing distance S of a viewer. Each of the plurality of grating control electrodes 4130 may be configured to control the on/off state of a grating element in the grating 4140 that corresponds to the grating control electrode 4130 according to a grating driving signal, so as to decide whether the grating element transmits light or blocks light, that is, whether the grating element belongs to a grating opening portion or a grating blocking portion. The grating driving signal generator 4110 may be configured to generate a plurality of sets of grating driving signals with each set corresponding to a viewing distance and including a plurality of grating driving signals. The grating driving controller 4120 may be configured to determine a set of grating driving signals that corresponds to the viewing distance, and configured to form a grating period corresponding to the viewing distance, each grating period including a plurality of grating control electrodes that correspond to the plurality of grating driving signals in a one-to-one relationship.

In an exemplary embodiment, the grating driving controller 4120 may also comprise a plurality of switch units configured to connect the set of grating driving signals that corresponds to the viewing distance and disconnect other sets of grating driving signals. The grating 4140 may comprise two substrates that are oppositely disposed and a liquid crystal layer or electrochromic material layer located between the two substrates. In other words, the grating 4140 may comprise a liquid crystal grating or an electrochromic material grating. However, those of ordinary skill in the art would understand that the present disclosure is not limited to a liquid crystal grating or an electrochromic material grating, but may be applied to any grating capable of controlling the on/off states of its grating elements via grating driving signals.

In an exemplary embodiment, the grating driving controller 4120 may also be configured to determine an overall grating width W through the following formula:

$$W = 2NP\frac{LS}{LS + PS_0},$$

wherein 2N is the resolution of the 2D display screen in a horizontal direction, P is a pixel or sub-pixel width of the 2D display screen, L is an interpupillary distance of human eyes, $S_0$ is a predetermined optimal viewing distance, and a placement height of the grating is set according to the viewing distance $S_0$.

After the overall grating width W is determined, the grating driving controller 4120 may also be configured to determine the grating period C through the following formula:

$$C = \frac{W}{N} = 2P\frac{LS}{LS + PS_0}.$$

The grating driving controller 4120 may also be configured to determine the number M of grating control electrodes in each grating period and the number M of grating driving signals in the set of grating driving signals through the following formula:

$$M = \frac{C}{W_e},$$

wherein $W_e$ is an electrode width. It should be noted that in each period, one grating control electrode corresponds to one grating driving signal, so the number of grating control electrodes and the number of driving signals for each period are equal, both of which may be labelled as M. After the number of electrodes and the number of driving signals for each period are calculated, a set of grating driving signal corresponding to that number may be selected and a grating period comprising the same number of grating control electrodes may be formed.

The viewpoint tracker 4150 may also be configured to determine a position of the viewer in a left-right direction, and the grating driving controller 4120 may also be configured to determine a position of the grating according to the position of the viewer in the left-right direction. The viewpoint tracker 4150 may comprise a camera, an eye tracker or an infrared rangefinder, and any other device capable of determining the distance or position of the viewer.

As stated above, each grating period comprises a grating opening portion and a grating blocking portion, which may be equal in size.

In an exemplary embodiment, the grating driving controller 4120 may also be configured to determine levels of grating driving signals in the set of grating driving signals. Thus, there may be formed the grating opening portion and the grating blocking portion for each grating period.

According to an exemplary embodiment, the grating driving circuit is provided with a series of grating driving signals that are divided into a plurality of sets with each set corresponding to a specific viewing distance. When a viewer is at a certain viewing distance from the screen, the viewpoint tracker records the viewing distance and activates a certain set of grating driving signals corresponding to the viewing distance so as to generate the grating period corresponding to the viewing distance. Thus, as for a grating adopting such a driving manner, the grating period corresponds to the viewing distance in a one-to-one relationship. In doing so, it is possible to track human eyes moving in a front-rear direction, such that the viewing distance is adjustable, 3D crosstalk may be significantly reduced and a 3D effect may be greatly improved.

The implementation of the grating driving circuit will be described with reference to FIGS. 5 to 8. FIGS. 5 to 8 respectively show a structural schematic view of a naked-eye 3D grating driving circuit with an adjustable viewing distance according to some embodiments of the present disclosure. In these exemplary embodiments, there is provided a series of grating driving signals. Suppose the grating driving circuit is designed to comprise a number A of adjusting distances, wherein A is an integer and greater than or equal to 2. It should be noted that these adjustable distances are viewing distances under an ideal condition with no crosstalk at all. As mentioned earlier, a 3D effect may also be achieved within a front-rear movement range $^A S$ around individual adjustable distances. However, it could be seen from the optical path map that there may be very small crosstalk in that range. In the presence of A adjustable distances, the grating driving signals may be divided into A sets with each set of grating driving signals corresponding to a specific viewing distance.

If it is assumed that a first set of grating driving signals comprises M grating driving signals, a second set of grating driving signals comprises M+1 grating driving signals, a third set of grating driving signals comprises M+2 grating driving signals and, by analogy, the last set of grating driving signals comprises M+A−1 grating driving signals, there should be provided $$\frac{A(2M + A - 1)}{2}$$

grating driving signals in total.

Suppose the middle set of grating driving signals comprises M grating driving signals and the difference between two adjacent sets of grating driving signals is one grating driving signal, there will be required to provide AM grating driving signals in total. The first set of grating driving signals comprises $$M - \frac{A - 1}{2}$$

grating driving signals, and the last set of grating driving signals comprises $$M + \frac{A - 1}{2}$$

grating driving signals.

Those of ordinary skill in the art would understand that according to the number of grating driving signals in other sets of grating driving signals, there may also be other ways to calculate the total number of driving signals and arrange them.

When a viewer is at a certain viewing distance from the screen, the viewpoint tracker determines and records the viewing distance. Then the number M of grating control electrodes in a grating period corresponding to the viewing distance and the number M of grating driving signals corresponding to the viewing distance may be determined according to the viewing distance, and in turn the sets of grating driving signals corresponding to the viewing distance may be determined. In doing so, the grating driving circuit may activate the set of grating driving signals that corresponds to the viewing distance, so as to generate and form a grating period corresponding to the viewing distance. In some embodiments, the set of grating driving signals that corresponds to the viewing distance may be retrieved from a pre-stored lookup table according to the viewing distance.

Figure 5:
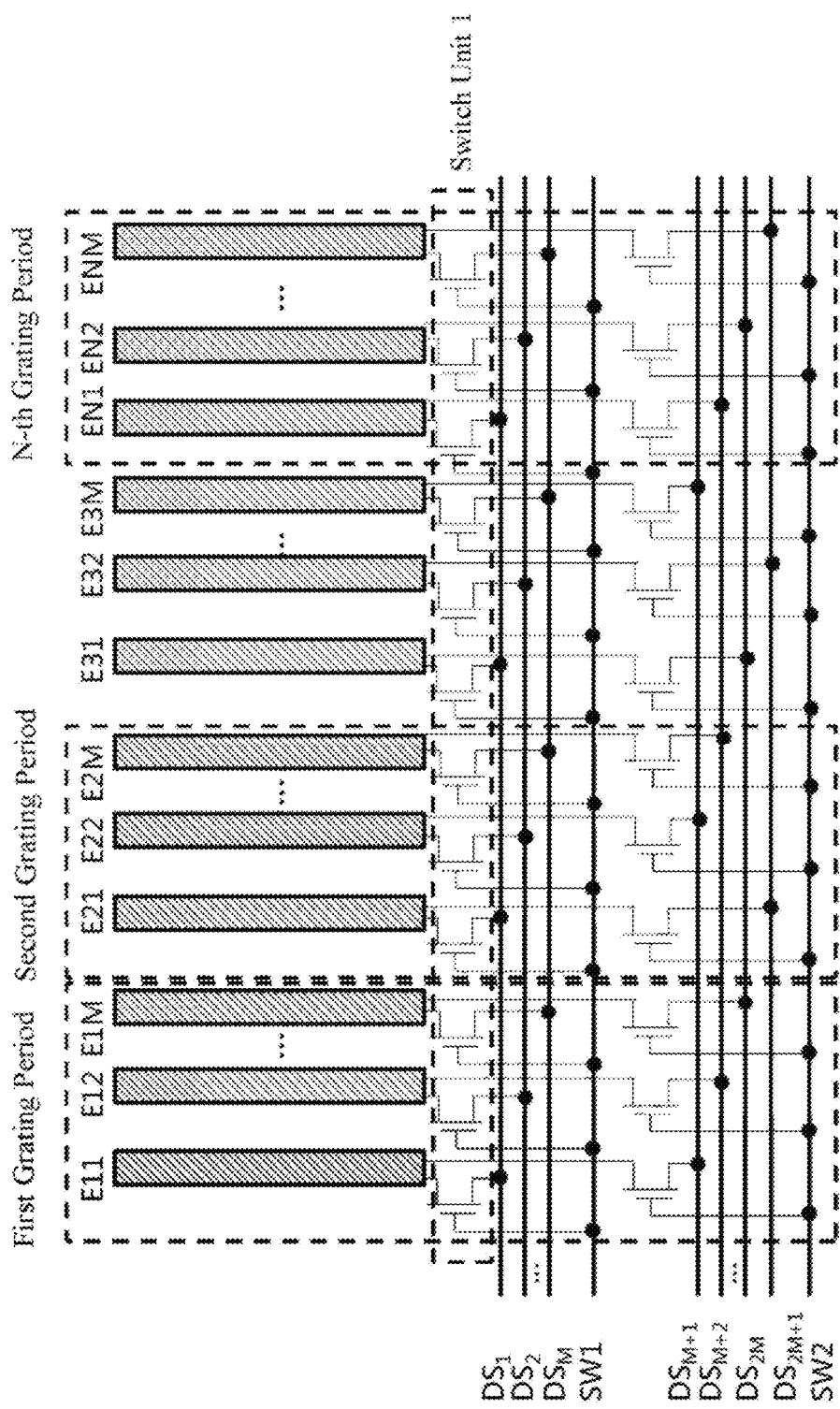
FIG. 5 is a structural schematic view of a naked-eye 3D grating driving circuit with an adjustable viewing distance according to an exemplary embodiment.

An exemplary implementation of a driving solution is illustrated below, in which A is equal to 2. Since A is 2, there are two viewing distances (denoted as $S_1$ and $S_2$) and two sets of driving signals. As shown in FIG. 5, with the viewing distance $S_1$, each grating period comprises M electrodes, each electrode has a width of $W_e$, and the total number of grating periods is N. The electrodes in the first grating period are numbered as $E_{11}$, $E_{12}$, ..., $E_{1M}$; the electrodes in the second grating period are numbered as $E_{21}$, $E_{22}$, ..., $E_{2M}$; and by analogy, the electrodes in the N-th grating period are numbered as $E_{N1}$, $E_{N2}$, ..., $E_{NM}$.

In addition, the grating driving circuit is also provided with 2M+1 grating driving signals that are divided into two sets, wherein the first set comprises the grating driving signals $DS_1$ to $DS_M$, and the second set comprises the grating driving signals $DS_{M+1}$ and $DS_{2M+1}$.

With the viewing distance S1, the electrodes in the grating are connected with the grating driving signals $DS_1$ to $DS_M$ by a switch unit 1. As shown in FIG. 5, the first electrode in each grating period, namely electrodes $E_{11}$, $E_{21}$, $E_{31}$, ..., $E_{N1}$, is connected with the driving signal $DS_1$ by the switch unit 1 (such as a switch transistor), the second electrode in each grating period, namely electrodes $E_{12}$, $E_{22}$, $E_{32}$, ..., $E_{N2}$, is connected with the driving signal $DS_2$ by the switch unit 1, and by analogy, the last electrode in each grating period, namely electrodes, $E_{1M}$, $E_{2M}$, $E_{3M}$, ..., $E_{NM}$, is connected with the driving signal $DS_M$ by the switch unit 1.

Figure 6:
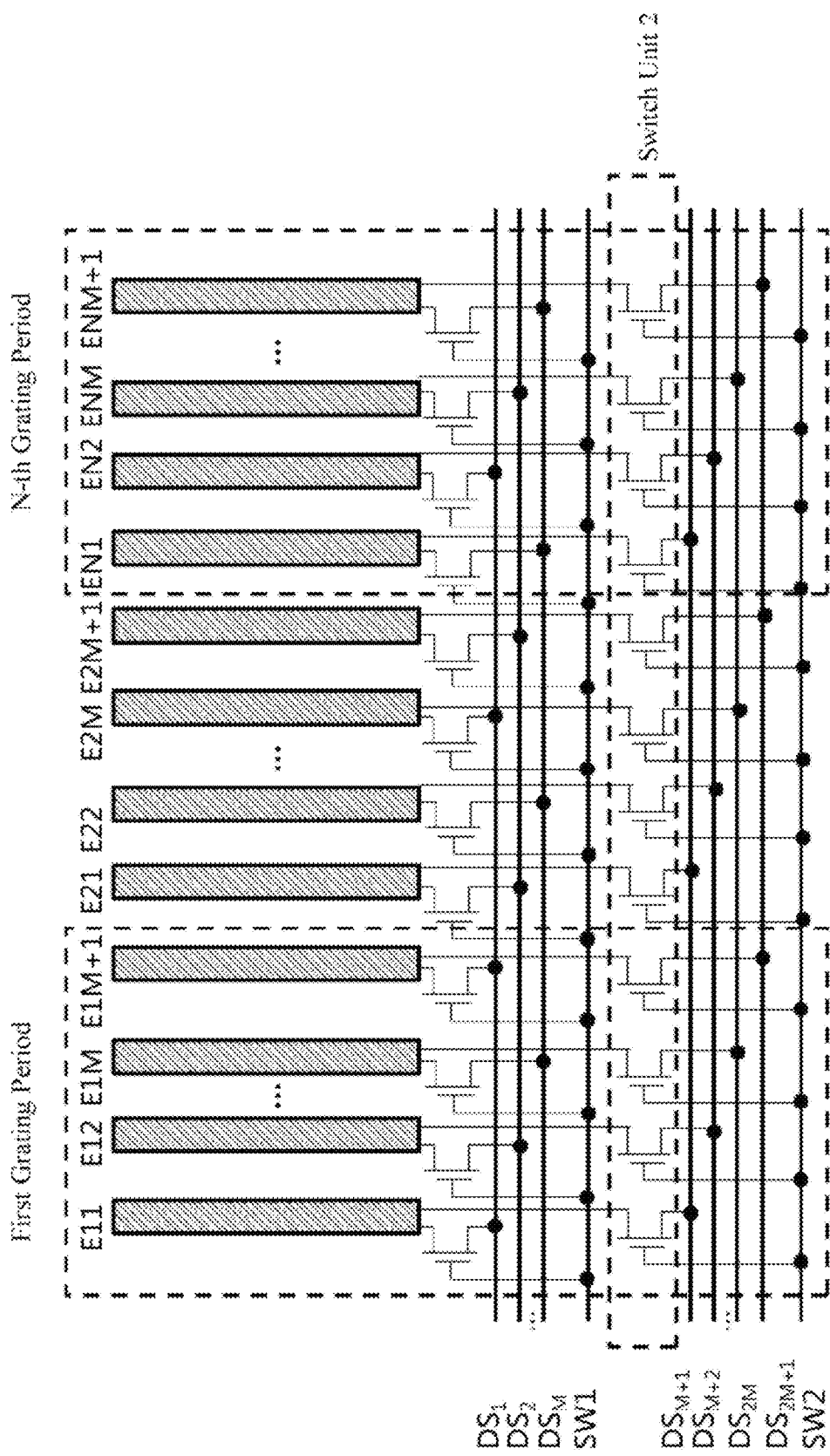
FIG. 6 is a structural schematic view of a naked-eye 3D grating driving circuit with an adjustable viewing distance according to an exemplary embodiment.

With the viewing distance $S_2$, the grating period changes, assuming that a grating period is enlarged by adding one electrode to each grating period. At this point, the number of electrodes in each grating period is changed to M+1, each electrode still has a width of $W_e$, and the total number of grating periods is still N. The electrodes in the first grating period are numbered as $E_{11}$, $E_{12}$, ..., $E_{1M}$, $E_{1(M+1)}$; the electrodes in the second grating period are numbered as $E_{21}$, $E_{22}$, ..., $E_{2M}$, $E_{2(M+1)}$; and by analogy, the electrodes in the N-th grating period are numbered as $E_{N1}$, $E_{N2}$, ..., $E_{NM}$, $E_{N(M+1)}$. As such, there are additionally provided with M+1 grating driving signals $DS_{M+1}$ to $DS_{2M+1}$. With the viewing distance $S_2$, the electrodes within the grating are connected with grating driving signals by the switch unit, such as the switch transistor. As shown in FIG. 6, the first electrode in each grating period, namely electrodes $E_{11}$, $E_{21}$, $E_{31}$, ..., $E_{N1}$, is connected with the driving signal $DS_{M+1}$ by the switch unit 2, the second electrode in each grating period, namely electrodes $E_{12}$, $E_{22}$, $E_{32}$, ..., $E_{N2}$, is connected with the driving signal $DS_{M+2}$ by the switch unit 2, and by analogy, the last electrode in each grating period, namely electrodes, $E_{1(M+1)}$, $E_{2(M+1)}$, $E_{3(M+1)}$, ..., $E_{N(M+1)}$, is connected with the driving signal $DS_{2M+1}$ by the switch unit 2.

Figure 7:
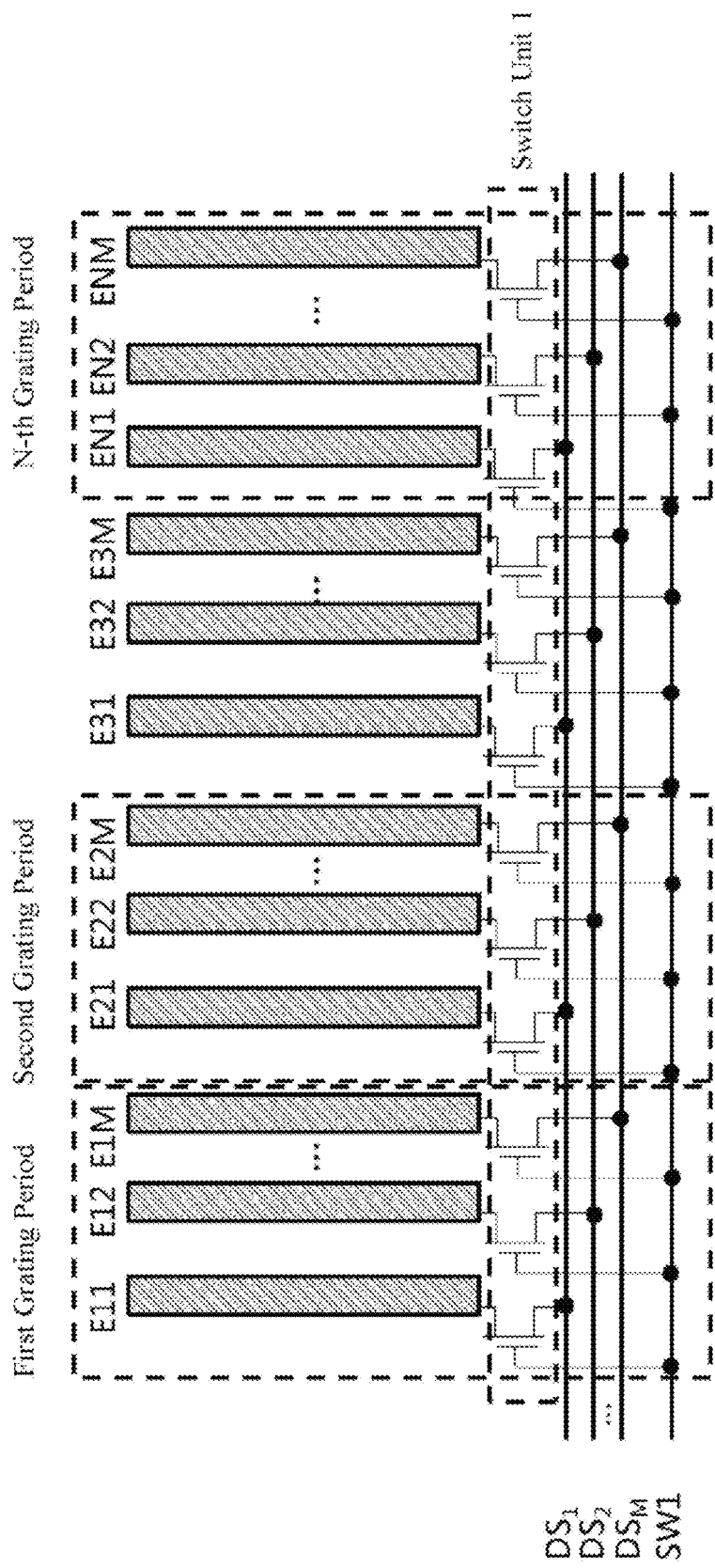
FIG. 7 is a simplified structural schematic view of the naked-eye 3D grating driving circuit shown in FIG. 5.
Figure 8:
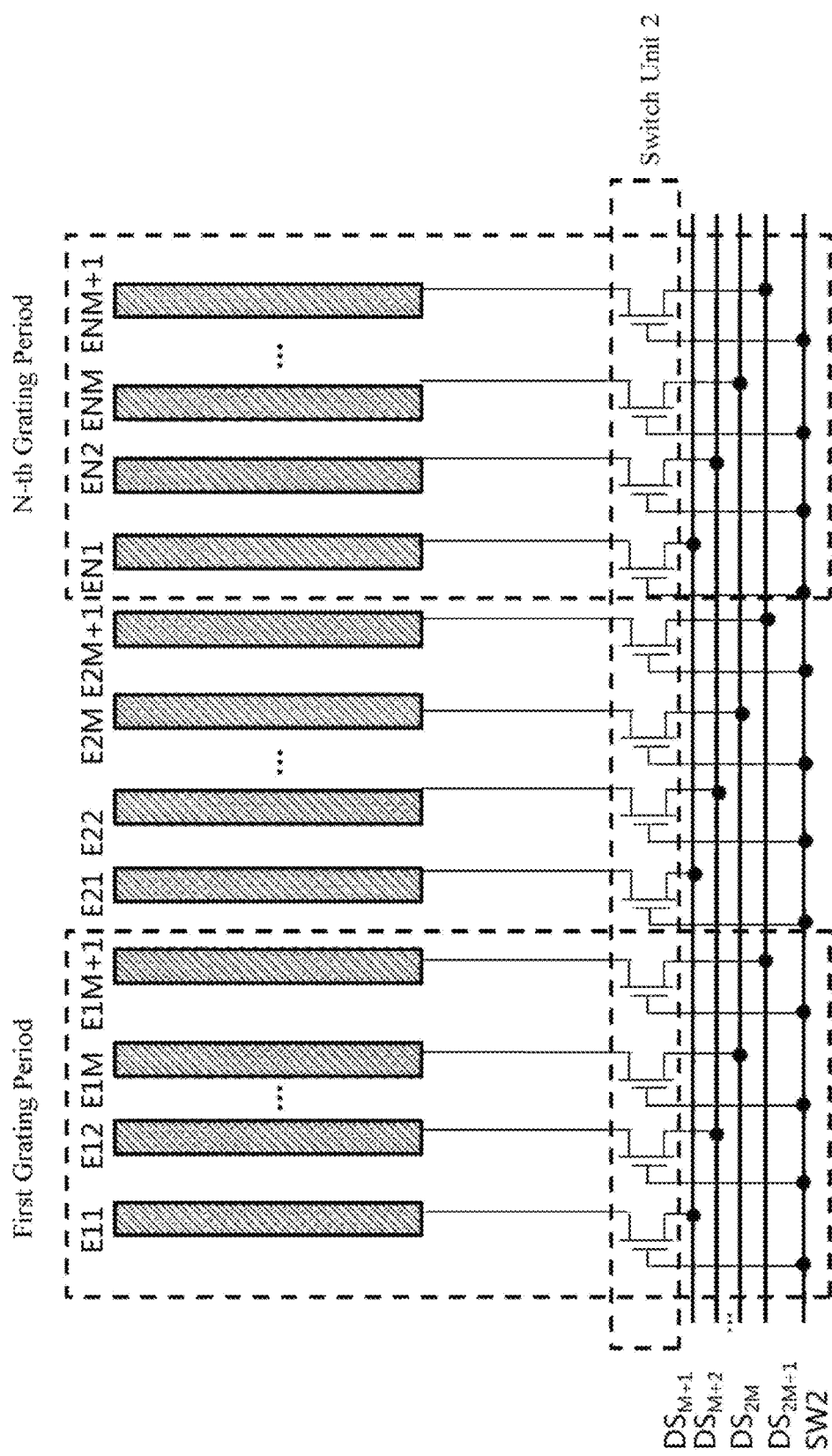
FIG. 8 is a simplified structural schematic view of the naked-eye 3D grating driving circuit shown in FIG. 6.

It may be found that by means of the above grating driver and driving method, there are two grating periods corresponding to two viewing distances. With the viewing distance $S_1$, the grating driving circuit may be simplified as shown in FIG. 7, and the grating period comprises M electrodes and corresponds to the grating driving signals $DS_1$ to $DS_M$. With the viewing distance $S_2$, the grating driving circuit may be simplified as shown in FIG. 8, and the grating period comprises M+1 electrodes and corresponds to the grating driving signals $DS_{M+1}$ to $DS_{2M+1}$.

It should be noted that although the circuit structures shown in FIGS. 5 to 8 utilizes two sets of grating driving signals, it is also possible, in other embodiments, to use more than two sets of grating driving signals, each set of grating driving signals corresponds to a viewing distance, and decision on which set of grating driving signals is transmitted to the electrodes in the grating is made through switch units.

Moreover, it should be noted that human eyes can still move in a front-rear direction within a range $^{\Delta}S$ around the optimal viewing distance $S_0$. Within the front-rear movement range $^{\Delta}S$, human eyes can still see a 3D image, and a 3D effect may still meet the requirement to some extent. Thus, when the difference between the two distances $S_1$ and $S_2$ is less than $^{\Delta}S$, it is possible to realize the naked-eye 3D display with continuously adjustable distances. When a certain actual distance is between the distances $S_1$ and $S_2$, one can decide which grating period and which set of grating driving signals are to be used according to which one of the distances $S_1$ and $S_2$ is closer to the actual distance.

Figure 9:
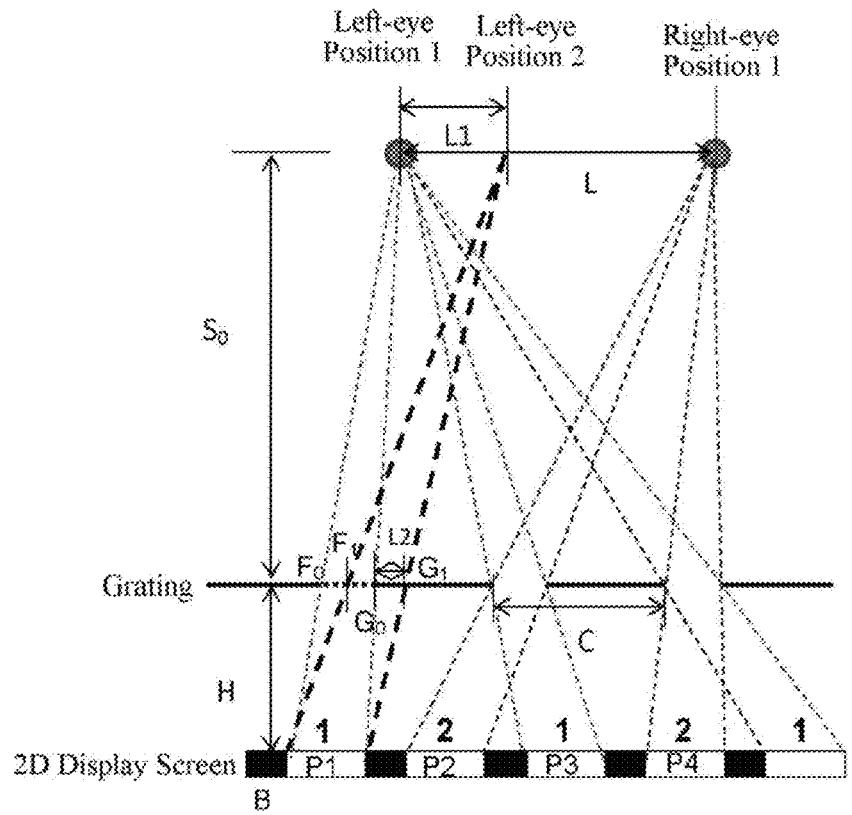
FIG. 9 is an optical path map formed when eyes move in a left-right direction at an optimal viewing distance $S_0$ according to an exemplary embodiment.

FIG. 9 shows an optical path map formed when eyes move in a left-right direction at an optimal viewing distance $S_0$ according to an embodiment of the present disclosure. As shown in FIG. 9, when the left eye is at the left-eye position 1, the left eye can see P1, P3, namely the left-eye View 1, rather than the right-eye View 2, through the grating opening $F_0G_0$. Correspondingly, the right eye can see P2, P4, namely the right-eye View 2, rather than the left-eye View 1, through the grating opening. Thus, the view seen by the left eye and the view seen by the right eye may be blended by a brain, thereby forming a stereoscopic image in the brain. When the left eye moves to the left-eye position 2, it cannot see a full left-eye View 1, but a partial right-eye view, through the original grating opening $F_0G_0$, so crosstalk occurs, thereby leading to a worse 3D effect, or even a failure of a 3D effect. At this time, the grating opening may be adjusted to $F_1G_1$, and the left eye can see P1, namely the left-eye View 1. It may be seen that when human eyes move, the position of the grating opening may be adjusted in real time to ensure that position on the 2D display screen seen by human eyes remains unchanged, thereby guaranteeing the 3D effect. It may be understood that, as shown in FIG. 9, the adjustment amount L2 of the position of the grating opening may be determined according to the left-right human eye movement distance L1, the viewing distance S and the grating placement height H. Optionally, the adjustment amount is a width of an integral number of grating control electrodes.

That is to say, when human eyes move at the optimal distance in the left-right direction, crosstalk may occur. In order to eliminate crosstalk resulting from the left-right movement, one may determine the viewer's movement in the left-right direction by means of human eye tracking technology, and accordingly move all of the grating periods in the left-right direction, so as to ensure that the left eye and the right eye see their corresponding views respectively without crosstalk. To be specific, this is achieved by adjusting positions of grating openings while keeping the grating period unchanged. For instance, in the grating driving circuit shown in FIGS. 5 to 8, the position of the grating in the left-right direction may be adjusted by adjusting positions of electrodes in each grating period. For instance, in FIG. 5, if the grating is moved to the right by a width of one electrode, the electrodes in the first grating period would be $E_{12}$, $E_{13}$, ..., $E_{1M}$, $E_{21}$; the electrodes in the second grating period would be $E_{22}$, ..., $E_{2M}$, $E_{31}$; and by analogy, the electrodes in the N-th grating period would be $E_{N2}$, ..., $E_{NM}$, $E_{N(M+1)}$. On the basis of the above-mentioned technical principles, those ordinarily skilled in the art would understand and realize different left-right displacements of the grating.

It should be noted that those of ordinary skill in the art would understand there still exists a left-right movement range for human eyes, which range is around a position corresponding to the current grating position and allowing achieving the optimal 3D effect. Within the left-right movement range, human eyes can still see the 3D image, and the 3D effect can still meet the requirement to some extent. Theoretically speaking, crosstalk occurs when eyes deviate from that position, but human eyes may not observe the crosstalk within that range and the 3D effect may still be deemed as satisfactory. Therefore, any position within that range may be regarded as the optimal viewing position.

Figure 10:
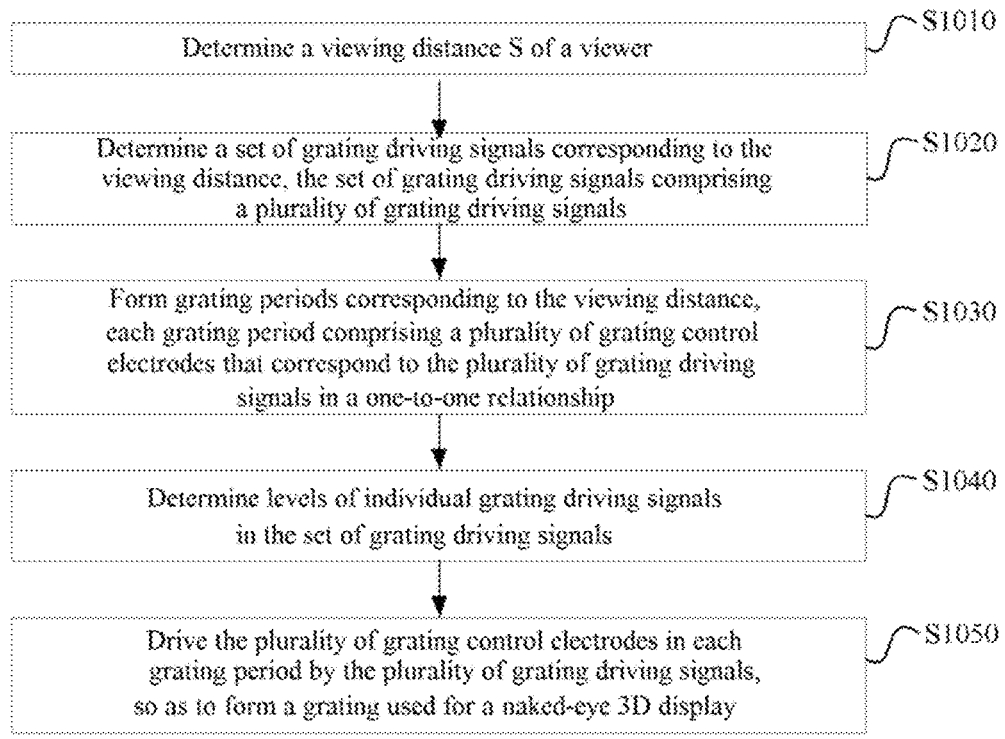
FIG. 10 is a schematic flow chart showing a grating driving method according to an exemplary embodiment.

FIG. 10 illustrates a schematic flow chart showing a grating driving method according to an exemplary embodiment. As shown in FIG. 10, the grating driving method may comprise the steps of:

Step S1010, determining a viewing distance S of a viewer;

Step S1020, determining a set of grating driving signals that corresponds to the viewing distance, the set of grating driving signals comprising a plurality of grating driving signals;

Step S1030, forming grating periods corresponding to the viewing distance, each grating period comprising a plurality of grating control electrodes that correspond to the plurality of grating driving signals in a one-to-one relationship; and Step S1050, driving the plurality of grating control electrodes in each grating period by the plurality of grating driving signals, thereby forming a grating used for a naked-eye 3D display.

As shown, in an exemplary embodiment, the grating driving method may also comprise the step of S1040, in which levels of the plurality of grating driving signals in the set of grating driving signals are determined before driving the plurality of grating control electrodes in each grating period by these grating driving signals.

FIG. 11 illustrates a schematic flow chart showing a method for determining a set of grating driving signals corresponding to a viewing distance S according to an exemplary embodiment. As shown in FIG. 11, the method for determining a set of grating driving signals corresponding to a viewing distance comprises the steps of:

Step S1110, determining an overall grating width W through the following formula:

$$W = 2NP\frac{LS}{LS + PS_0},$$

wherein 2N is a resolution of a 2D display screen in a horizontal direction, P is a pixel or sub-pixel width of the 2D display screen, L is an interpupillary distance of human eyes, $S_0$ is a predetermined optimal viewing distance, and a placement height of the grating is set according to the viewing distance $S_0$.

Step S1020, the grating period is determined through the following formula:

$$C = \frac{W}{N} = 2P\frac{LS}{LS + PS_0}.$$

Step S1030, the number M of grating control electrodes in each grating period and the number M of the grating driving signals in the set of grating driving signals are determined through the following formula:

$$M = \frac{C}{W_e},$$

wherein $W_e$ is an electrode width.

Figure 12:
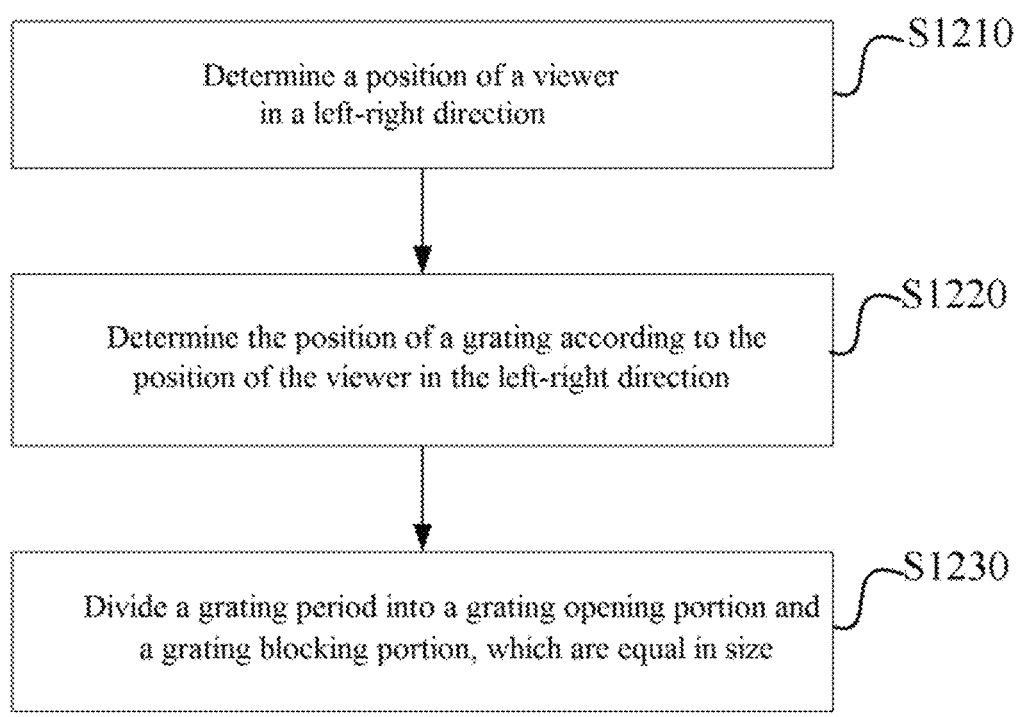
FIG. 12 is a schematic flow chart showing a method for forming grating periods corresponding to a viewing distance according to an exemplary embodiment.

FIG. 12 illustrates a schematic flow chart showing a method for forming grating periods corresponding to a viewing distance according to an embodiment of the present disclosure. As shown in FIG. 12, the method for forming grating periods corresponding to a viewing distance may further comprise the steps of:

Step S1210, determining a position of the viewer in a left-right direction, and

Step S1220, determining a position of the grating according to the position of the viewer in the left-right direction.

Step S1230, the grating period is divided into a grating opening portion and a grating blocking portion, which are equal in size. Since the overall grating width W and the grating position have been determined previously, the grating is substantially fixed. If the grating opening portion and blocking portion are further determined, the grating may be formed to cooperate with the 2D display screen to thereby provide a 3D effect for viewers.

It may be understood that the above depictions are merely exemplary embodiments of the present disclosure, but the protection scope of the present disclosure is not limited thereto. It shall be noted that without departing from the spirit and principle of the present disclosure, those of ordinary skill in the art can readily conceive of various variations or replacements, which shall fall within the protection scope of the present disclosure. Thus, the protection scope of the present disclosure shall be based on the scope of the appended claims.

It should be noted that the above embodiments are only illustrated by way of individual function modules division. In practical application, the above functions may be allocated to different functional modules as desired. The internal structure of the device may be divided into different functional modules so as to accomplish all or part of the functions as stated above. In addition, function(s) of the above one module may be achieved by a plurality of modules, and functions of the plurality of modules may be integrated into one module.

In the claims, any reference sign in parentheses should not be interpreted as a limitation to the claims. The terms "comprise/include" do not exclude the presence of elements or steps other than those listed in the claims. Unless otherwise specified, the word "a" or "an" in front of elements does not exclude the presence of a plurality of such elements.

In an apparatus or system claim enumerating several devices, one or more devices may be embodied in the same hardware project. The fact that only some measures are recited in mutually different dependent claims does not mean that the combination of those measures cannot be utilized advantageously.

The invention claimed is:

1. A grating driving circuit, comprising:
a plurality of grating control electrodes configured to control on/off states of corresponding grating elements in the grating according to grating driving signals;
a grating driving signal generator configured to generate a plurality of sets of grating driving signals, wherein a set of grating driving signal corresponds to a viewing distance of a viewer and the plurality of sets of grating driving signals comprise different numbers of grating driving signals; and
a grating driving controller configured to determine a set of grating driving signals that corresponds to the viewing distance by determining the number of grating control electrodes in a grating period corresponding to the viewing distance and the number of grating driving signals corresponding to the viewing distance according to the viewing distance, and configured to form a plurality of grating periods corresponding to the viewing distance, wherein an individual grating period includes a plurality of grating control electrodes that correspond to grating driving signals of a determined set of grating driving signals in a one-to-one relationship.

2. The grating driving circuit according to claim 1, wherein the grating driving controller further comprises a plurality of switch units configured to connect the set of grating driving signals that corresponds to the viewing distance and disconnect other set(s) of grating driving signals.

3. The grating driving circuit according to claim 1, wherein the grating comprises two substrates that are oppositely disposed and a liquid crystal layer or electrochromic material layer located between the two substrates.

4. The grating driving circuit according to claim 1, wherein the grating driving controller is also configured to determine an overall grating width W through the following formula:

$$W = 2NP\frac{LS}{LS + PS_0},$$

wherein 2N is a resolution of a 2D display screen in a horizontal direction, P is a pixel or sub-pixel width of the 2D display screen, L is an interpupillary distance of human eyes, $S_0$ is a predetermined optimal viewing distance, and a placement height of the grating is set according to the viewing distance $S_0$.

5. The grating driving circuit according to claim 4, wherein the grating driving controller is also configured to determine the grating period C through the following formula:

$$C = \frac{W}{N} = 2P\frac{LS}{LS + PS_0}.$$

6. The grating driving circuit according to claim 4, wherein the grating driving controller is also configured to determine the number M of grating control electrodes in each grating period and the number M of grating driving signals in the set of gratin driving signals through the following formula:

$$M = \frac{C}{W_e},$$

wherein $W_e$ is an electrode width.

7. The grating driving circuit according to claim 6, further comprising a viewpoint tracker configured to determine the viewing distance, wherein the viewpoint tracker is also configured to determine a position of the viewer in a left-right direction, and the grating driving controller is also configured to determine a position of the grating according to the position of the viewer in the left-right direction.

8. The grating driving circuit according to claim 1, wherein each grating period comprises a grating opening portion and a grating blocking portion, which are equal in size.

9. The grating driving circuit according to claim 8, wherein the grating driving controller is also configured to determine a level of each grating driving signal in the set of grating driving signals.

10. A grating driving method, comprising:
determining a viewing distance of a viewer;
generating a plurality of sets of grating driving signals, wherein a set of grating driving signal corresponds to a viewing distance and the plurality of sets of grating driving signals comprise different numbers of grating driving signals;
determining a set of grating driving signals from the plurality of sets of grating driving signals that corresponds to the viewing distance by determining the number of grating control electrodes in a grating period corresponding to the viewing distance and the number of grating driving signals corresponding to the viewing distance according to the viewing distance;
forming a plurality of grating periods corresponding to the viewing distance, wherein an individual grating period comprises a plurality of grating control electrodes that correspond to grating driving signals of a determined set of grating driving signals in a one-to-one relationship; and
driving respective grating control electrodes in individual grating periods by the plurality of grating driving signals to control on/off states of grating elements in the grating that correspond to the grating control electrodes according to respective grating driving signals, so as to form a grating for a naked-eye 3D display.

11. The grating driving method according to claim 10, wherein the step of determining a set of grating driving signals that corresponds to the viewing distance further comprises:
determining an overall grating width W through the following formula:

$$W = 2NP\frac{LS}{LS + PS_0},$$

wherein 2N is a resolution of a 2D display screen in a horizontal direction, P is a pixel or sub-pixel width of the 2D display screen, L is an interpupillary distance of human eyes, $S_0$ is a predetermined optimal viewing distance, and a placement height of the grating is set according to the viewing distance $S_0$.

12. The grating driving method according to claim 11, wherein the step of determining a set of grating driving signals that corresponds to the viewing distance further comprises:

determining the grating period C through the following formula:

$$C = \frac{W}{N} 2P \frac{LS}{LS + PS_0}.$$

13. The grating driving method according to claim 12, wherein the step of determining a set of grating driving signals that corresponds to the viewing distance further comprises:

determining the number M of grating control electrodes in each grating period and the number M of grating driving signals in the set of grating driving signals through the following formula:

$$M = \frac{C}{W_e},$$

wherein $W_e$ is an electrode width.

14. The grating driving method according to claim 13, wherein the step of forming grating periods corresponding to the viewing distance further comprises:

determining a position of the viewer in a left-right direction; and determining a position of the grating according to the position of the viewer in the left-right direction.

15. The grating driving method according to claim 10, wherein the step of forming grating periods corresponding to the viewing distance further comprises:

dividing the grating period into a grating opening portion and a grating blocking portion, which are equal in size.

16. The grating driving method according to claim 15, further comprising:

determining a level of each grating driving signal in the set of grating driving signals before driving the plurality of grating control electrodes in each grating period by the plurality of grating driving signals.

17. A naked-eye 3D display, comprising:
a 2D display screen;
a grating including a plurality of grating elements, each grating element having an on/off state controlled by a grating driving signal; and
a grating driving circuit according to any one of claims 1 to 9 for driving the grating.

18. The grating driving circuit according to claim 1, further comprising a viewpoint tracker configured to determine the viewing distance.

19. The naked-eye 3D display according to claim 17, further comprising a viewpoint tracker configured to determine the viewing distance.

20. The naked-eye 3D display according to claim 17, wherein the grating driving controller is also configured to determine an overall grating width W through the following formula:

$$W = 2NP \frac{LS}{LS + PS_0},$$

wherein 2N is a resolution of a 2D display screen in a horizontal direction, P is a pixel or sub-pixel width of the 2D display screen, L is an interpupillary distance of human eyes, $S_0$ is a predetermined optimal viewing distance, and a placement height of the grating is set according to the viewing distance $S_0$.

* * * * *